United States Patent
Jairazbhoy et al.

(10) Patent No.: US 10,396,411 B2
(45) Date of Patent: Aug. 27, 2019

(54) TRACTION BATTERY THERMAL PLATE WITH TRANSVERSE CHANNEL CONFIGURATION

(71) Applicant: Ford Global Technologies, LLC, Dearborn, MI (US)

(72) Inventors: Vivek Amir Jairazbhoy, Farmington Hills, MI (US); George Albert Garfinkel, Westland, MI (US); Neil Robert Burrows, White Lake Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 733 days.

(21) Appl. No.: 14/189,123

(22) Filed: Feb. 25, 2014

(65) Prior Publication Data
US 2015/0244039 A1    Aug. 27, 2015

(51) Int. Cl.
| | |
|---|---|
| *H01M 10/625* | (2014.01) |
| *H01M 10/6556* | (2014.01) |
| *H01M 10/617* | (2014.01) |
| *H01M 2/10* | (2006.01) |
| *H01M 10/42* | (2006.01) |

(52) U.S. Cl.
CPC ....... *H01M 10/625* (2015.04); *H01M 10/617* (2015.04); *H01M 10/6556* (2015.04); *H01M 2/1077* (2013.01); *H01M 2010/4271* (2013.01)

(58) Field of Classification Search
CPC combination set(s) only.
See application file for complete search history.

(56) References Cited

U.S. PATENT DOCUMENTS

| | | |
|---|---|---|
| 4,322,776 A | 3/1982 | Job et al. |
| 8,268,472 B2 | 9/2012 | Ronning et al. |

(Continued)

FOREIGN PATENT DOCUMENTS

| | | |
|---|---|---|
| CN | 103390742 A | 11/2013 |
| JP | 2010157502 A | 7/2010 |

OTHER PUBLICATIONS

State Intellectual Property Office of China, First Office Action for the corresponding Chinese Patent Application No. 201510087077.1 dated Apr. 28, 2018.

*Primary Examiner* — Miriam Stagg
*Assistant Examiner* — Lilia Nedialkova
(74) *Attorney, Agent, or Firm* — David B. Kelley; Brooks Kushman P.C.

(57) ABSTRACT

A traction battery assembly for a vehicle is provided. The traction battery assembly may include a battery cell array having a plurality of battery cells. A thermal plate may be positioned beneath the battery cells and be configured for thermal communication therewith. The thermal plate may define a plurality of channel configurations within the thermal plate. Each of the channel configurations may correspond to one of the battery cells and include an inlet and outlet on a same side portion of the thermal plate. An inlet plenum may be in communication with the inlets and an outlet plenum may be in communication with the outlets. The channel configurations and plenums may be arranged such that fluid exiting the inlet plenum enters the channel configurations via the outlets and fluid exiting the outlets enters the outlet plenum and not into the inlet of another one of the channel configurations.

19 Claims, 6 Drawing Sheets

(56) References Cited

U.S. PATENT DOCUMENTS

| | | |
|---|---|---|
| 8,297,686 B2 | 10/2012 | Redmond |
| 2004/0126629 A1 | 7/2004 | Reiser |
| 2006/0291165 A1 | 12/2006 | Flesch et al. |
| 2007/0141453 A1 | 6/2007 | Mahalingam et al. |
| 2009/0258289 A1 | 10/2009 | Weber et al. |
| 2010/0151300 A1* | 6/2010 | Gutsch ............... H01M 10/482 |
| | | 429/61 |
| 2010/0282452 A1 | 11/2010 | Diem et al. |
| 2010/0307723 A1 | 12/2010 | Thomas et al. |
| 2011/0027640 A1 | 2/2011 | Gadawski et al. |
| 2011/0200862 A1* | 8/2011 | Kurosawa ........... H01M 2/1016 |
| | | 429/120 |
| 2011/0206967 A1 | 8/2011 | Itsuki |
| 2011/0212355 A1 | 9/2011 | Essinger et al. |
| 2011/0281145 A1 | 11/2011 | TenHouten |
| 2012/0009455 A1 | 1/2012 | Yoon |
| 2012/0045681 A1 | 2/2012 | Klaus et al. |
| 2012/0148889 A1* | 6/2012 | Fuhr et al. ...................... 429/87 |
| 2012/0244397 A1* | 9/2012 | TenHouten et al. ............ 429/61 |
| 2012/0308868 A1* | 12/2012 | Kruger ............... H01M 2/1077 |
| | | 429/120 |
| 2013/0108897 A1 | 5/2013 | Christian et al. |
| 2013/0143093 A1 | 6/2013 | Teng et al. |
| 2013/0164567 A1 | 6/2013 | Olsson et al. |
| 2013/0164576 A1* | 6/2013 | Cha ...................... H01M 10/65 |
| | | 429/72 |
| 2014/0356652 A1 | 12/2014 | Boddakayala et al. |
| 2015/0244038 A1 | 8/2015 | Jairazbhoy et al. |
| 2015/0244039 A1 | 8/2015 | Jairazhboy et al. |
| 2015/0244044 A1 | 8/2015 | Boddakayala et al. |
| 2015/0263397 A1 | 9/2015 | Janarthanam et al. |

* cited by examiner

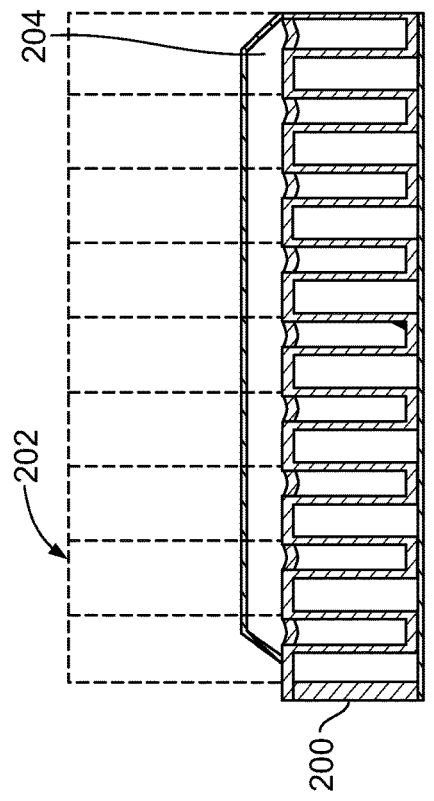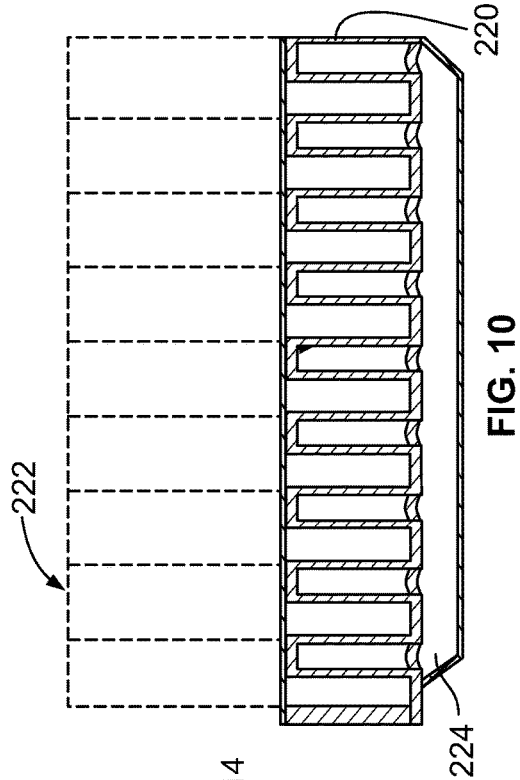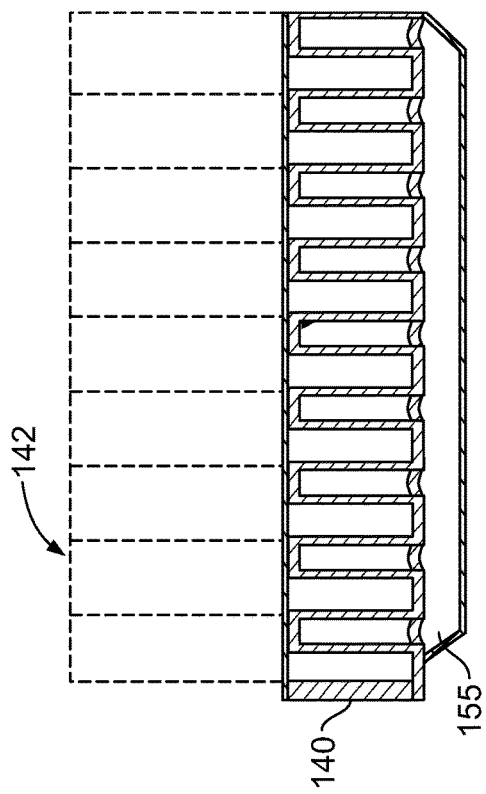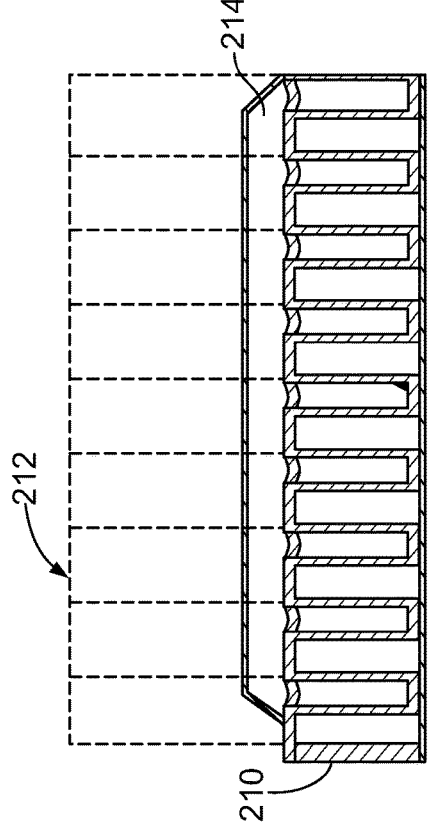

TRACTION BATTERY THERMAL PLATE WITH TRANSVERSE CHANNEL CONFIGURATION

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs) or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in regulating temperature of the HV battery components, systems, and individual battery cells.

SUMMARY

A vehicle includes a plurality of battery cells, an outlet plenum, and a thermal plate. The thermal plate is configured to support the battery cells and defines an inlet plenum and a plurality of u-channel configurations. Each of the u-channel configurations corresponds to one of the cells and includes an inlet and outlet on a same side portion of the thermal plate. Fluid exiting the outlets empties into the outlet plenum. The inlets and outlets of the u-channel configurations may be proximate to a same end of the corresponding battery cell. Each of the u-channel configurations may define an entry channel, an exit channel, and a router therebetween. The channels and router may be arranged such that fluid flow within the entry and exit channels is substantially parallel with an orientation of the corresponding battery cell. Each of the routers may be at least partially disposed outside a region defined by a footprint of the corresponding battery cell. Each of the u-channel configurations may define an even number of channels. At least some surfaces of the thermal plate defining the u-channel configurations may include flow features configured to increase an effective area of the at least some of the surfaces. The flow features may include dimples, pedestals, or metal foam.

A vehicle includes a plurality of battery cells, an inlet plenum, and a thermal plate. The thermal plate is positioned beneath the battery cells and is configured for thermal communication therewith. The thermal plate defines an outlet plenum and a plurality of u-channels within the plate. Each of the u-channels corresponds to one of the battery cells and includes an inlet and outlet on a same side portion of the thermal plate. Fluid exiting the inlet plenum enters the u-channels via the inlets. The inlet and outlet of each of the u-channels may be proximate to a same end of the corresponding battery cell. Each of the u-channels may define an entry channel, an exit channel, and a router therebetween. The channels and router may be arranged such that fluid flow within the entry and exit channels is substantially parallel with an orientation of the corresponding battery cell. Each of the routers may be at least partially disposed outside a region defined by a footprint of the corresponding battery cell. At least some surfaces of the thermal plate defining the u-channels may include flow features configured to increase an effective area of the at least some of the surfaces. The flow features may include dimples, pedestals, or metal foam.

A traction battery system includes a battery cell array having battery cells and a thermal plate positioned adjacent to the battery cells. The thermal plate is configured for thermal communication with the battery cells and defines a plurality of channel configurations each including an entry channel having an inlet, an exit channel having an outlet, and a wall separating the entry and exit channels. The traction battery system further includes an inlet plenum and an outlet plenum. The inlet and outlet plenums are in communication with the inlets and the outlets such that fluid exiting the outlets empties into the outlet plenum and not into the inlet of another one of the channels. The inlet and outlet of each of the channel configurations may be adjacent to one another. Fluid flow within the entry and exit channels of each of the channel configurations may be substantially parallel with an orientation of the corresponding battery cell. The inlets and outlets may be located on a same side portion of the thermal plate. The channel configurations may be arranged such that the entry and exit channels of different channel configurations share common walls. At least some surfaces of the thermal plate defining the channel configurations may include flow features configured to increase an effective area of the at least some of the surfaces. The flow features may include dimples, pedestals, or metal foam.

BRIEF DESCRIPTION OF THE DRAWINGS

FIG. 7 is a side view, in cross-section, of a plenum configuration for use with a traction battery assembly in which an outlet plenum is secured below a thermal plate.

FIG. 8 is a side view, in cross-section, of a plenum configuration for use with a traction battery assembly in which an inlet plenum is secured above a thermal plate.

FIG. 9 is a side view, in cross-section, of a plenum configuration for use with a traction battery assembly in which an outlet plenum is secured above a thermal plate.

FIG. 10 is a side view, in cross-section, of a plenum configuration for use with a traction battery assembly in which an inlet plenum is secured below a thermal plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
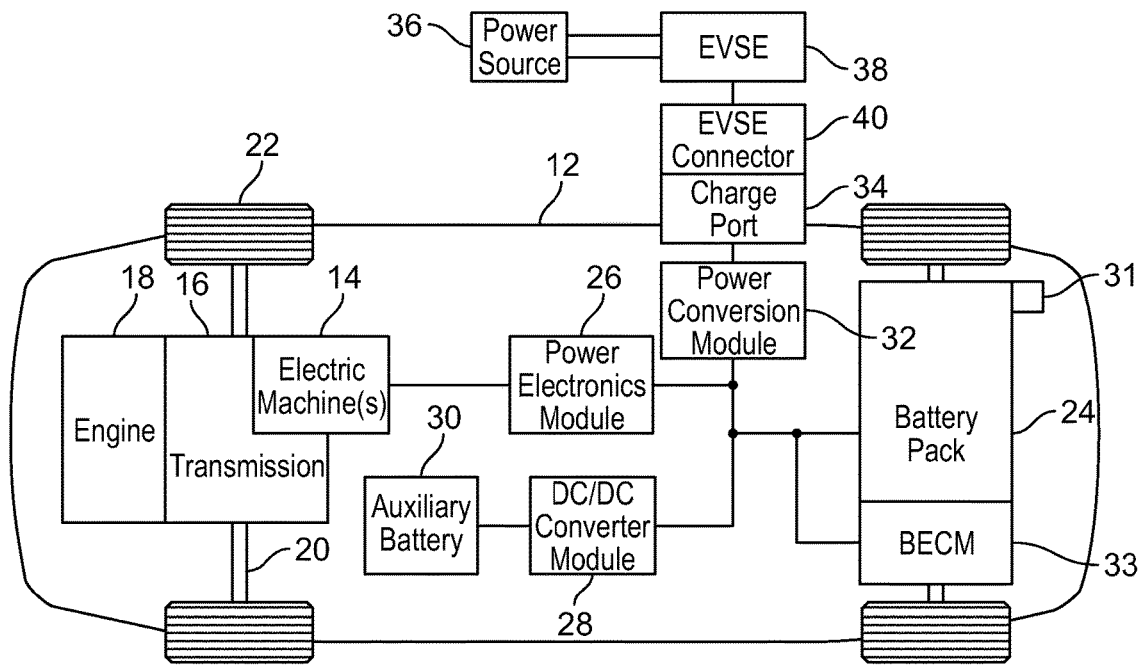
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be, for example, an electric vehicle such as a plug-in hybrid vehicle, or a battery-electric vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another. The DC/DC converter module 28 and BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cell array 88 during vehicle operations. Uniform thermal fluid distribution and high heat transfer capability are two thermal plate 90 considerations for providing effective thermal management of the battery cell arrays 88 and other surrounding components. Since heat transfers between thermal plate 90 and thermal fluid via conduction and convection, the surface area in a thermal fluid flow field is important for effective heat transfer, both for removing heat and for preheating the battery cells 92 at cold temperatures. For example, charging and discharging the battery cells generates heat which may negatively impact performance and life of the battery cell array 88 if not removed. Alternatively, the thermal plate 90 may also provide heat to preheat the battery cell array 88 when subjected to cold temperatures.

Figure 2:
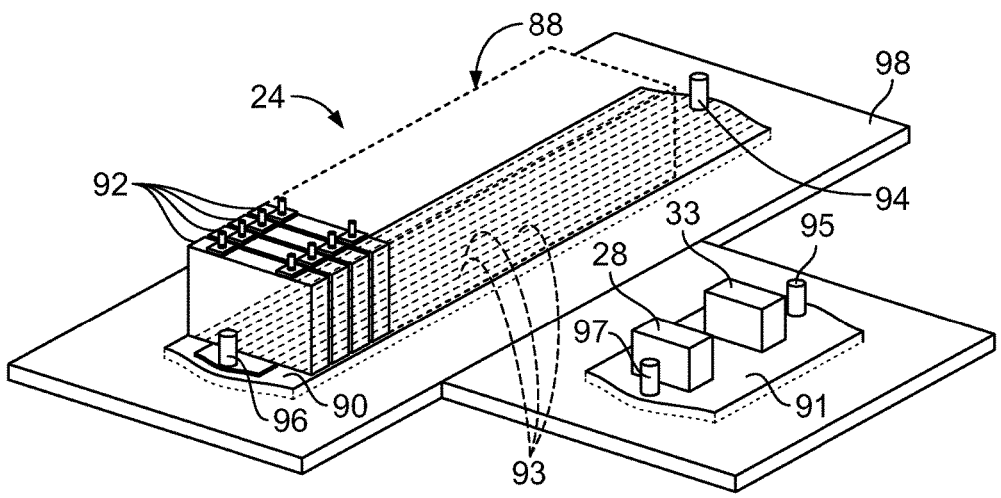
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, thermal plate 91, battery cell arrays 88, and other components. The battery tray 98 may include one or more recesses to receive thermal plates.

Different battery pack configurations may be available to address individual vehicle variables including packaging constraints and power requirements. The battery cell arrays 88 may be contained within a cover or housing (not shown) to protect and enclose the battery cell arrays 88 and other surrounding components, such as the DC/DC converter module 28 and the BECM 33. The battery cell arrays 88 may be positioned at several different locations including below a front seat, below a rear seat, or behind the rear seat of the vehicle, for example. However, it is contemplated the battery cell arrays 88 may be positioned at any suitable location in the vehicle 12.

Two examples of desired thermal plate deliverables may include (i) extracting a maximum amount of heat from the battery cells and (ii) maintaining a substantially uniform temperature at a base of the battery cells. To achieve these deliverables, a thermal management system may take several considerations into account. For example, a temperature of the battery cell may vary across the cell between a minimum and a maximum temperature which may be referred to as a battery cell delta temperature ("cell $\Delta T$"). In a battery cell array, the temperatures of the battery cells may vary across the battery cell array between a minimum and maximum temperature which may be referred to as a battery cell array delta temperature ("array $\Delta T$"). Lower cell $\Delta T$ and array $\Delta T$ measurements typically indicate a more uniform temperature distribution throughout the battery cell and battery cell array, respectively. As such, maximizing overall heat transfer efficiency between the battery cell array and thermal plate may assist in minimizing cell $\Delta T$ and array $\Delta T$. A desired cell $\Delta T$ and a desired array $\Delta T$ may vary according to power requirements for different vehicles and thermal management systems.

Figure 3C:
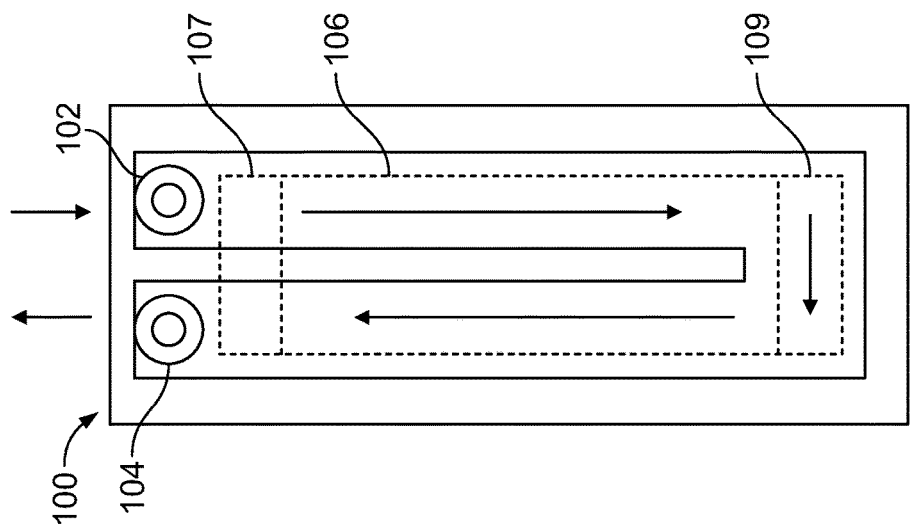
FIG. 3C is an illustrative plan view of a thermal plate configured for U-flow of thermal fluid.
Figure 3B:
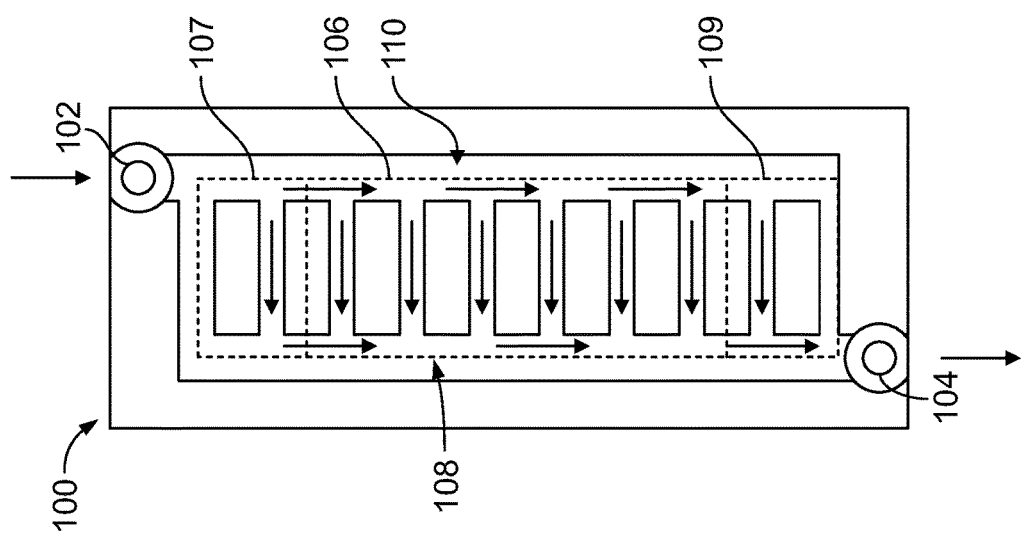
FIG. 3B is an illustrative plan view of a thermal plate configured for parallel flow of thermal fluid.
Figure 3A:
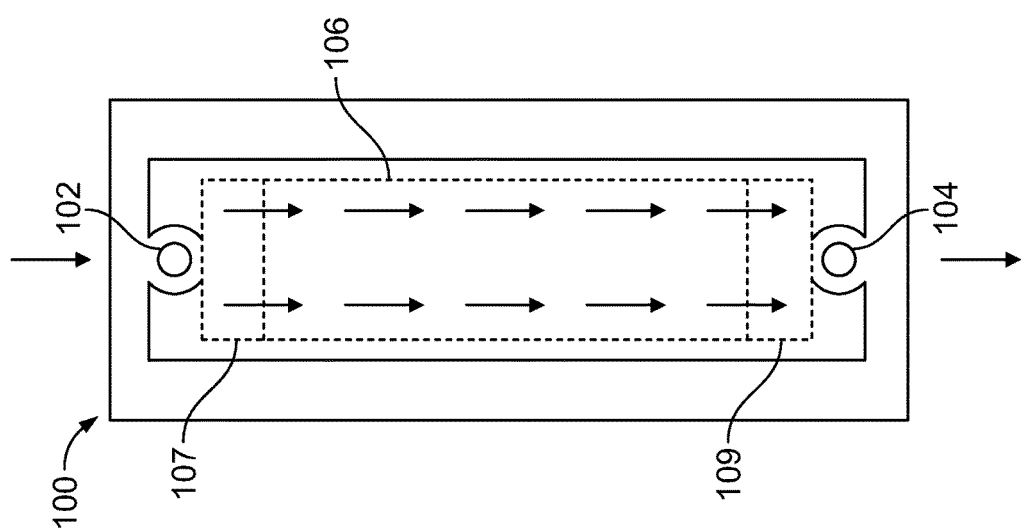
FIG. 3A is an illustrative plan view of a thermal plate configured for serial flow of thermal fluid.

Thermal plates may use varying types of liquid flow patterns to assist in extracting heat from the battery cells and battery cell arrays, and thus obtain desired cell $\Delta T$ and array $\Delta T$ performance. Thermal plate 100 in FIGS. 3A through 3C is shown in three configurations to illustrate examples of liquid serial flow, parallel flow, and U-flow, respectively. Thermal fluid, such as coolant, refrigerant, or water, may enter the thermal plate 100 via inlet port 102, travel across the thermal plate 100 as indicated by the directional reference arrows, and then exit the thermal plate 100 via outlet port 104. A footprint of a battery cell array 106 is shown with a dashed line. The battery cell array 106 may include battery cells such as a battery cell 107 and a battery cell 109, the footprints of which are also both shown with dashed lines. With each type of liquid flow example, thermal fluid traveling through the thermal plate 100 may absorb heat generated from the battery cells of the battery cell array 106.

In serial flow as shown in FIG. 3A, thermal fluid enters thermal plate 100 via inlet port 102 and may travel across the serial flow field in a substantially uniform fashion. The battery cell 109 is the last battery cell of the battery cell array 106 and nearest the outlet port 104. In this example, the battery cell 109 will operate at a higher temperature than the battery cell 107 nearer to the inlet port 102 since the thermal fluid flowing underneath the battery cell 109 will have absorbed heat from the battery cell array 106 while traveling across the thermal plate 100. The difference in operating temperatures for the battery cell 107 and battery cell 109 will drive a high array $\Delta T$ of battery cell array 106 in this example which may negatively affect vehicle performance.

In parallel flow as shown in FIG. 3B, thermal fluid enters the thermal plate 100 via the inlet port 102 and travels along an entry channel 110 prior to distribution in a horizontal direction below the battery cell array 106. The thermal fluid will be at its coolest temperature while in the entry channel 110. A portion of the battery cells 107 and 109 within the battery cell array 106 nearer to an exit channel 108 will see warmer thermal fluid than the portions of battery cells 107 and 109 which are nearer to the entry channel 110. This may result in a higher cell ΔT which may negatively affect the performance of the battery cell array 106 and the life of the battery cells therein.

In U-flow as shown in FIG. 3C, the battery cell 109, furthest from the inlet port 102 and outlet port 104, may see average temperature (relative to the rest of the battery cells within the battery cell array 106) while the battery cell 107, nearest the inlet port 102 and outlet port 104, may see the warmest fluid on one half of the battery cell and the coolest fluid on the other half, which may tend to average one another out. Therefore, the measured array ΔT is lower than parallel flow and serial flow and the U-flow system may consequently improve vehicle performance. However, in this example of U-flow the first few battery cells nearest the inlet port 102 and outlet port 104 may see a difference in temperature between their respective two halves which may result in a high cell ΔT. This may negatively affect the performance of the battery cell array 106 and the life of the battery cells therein.

Figure 4A:
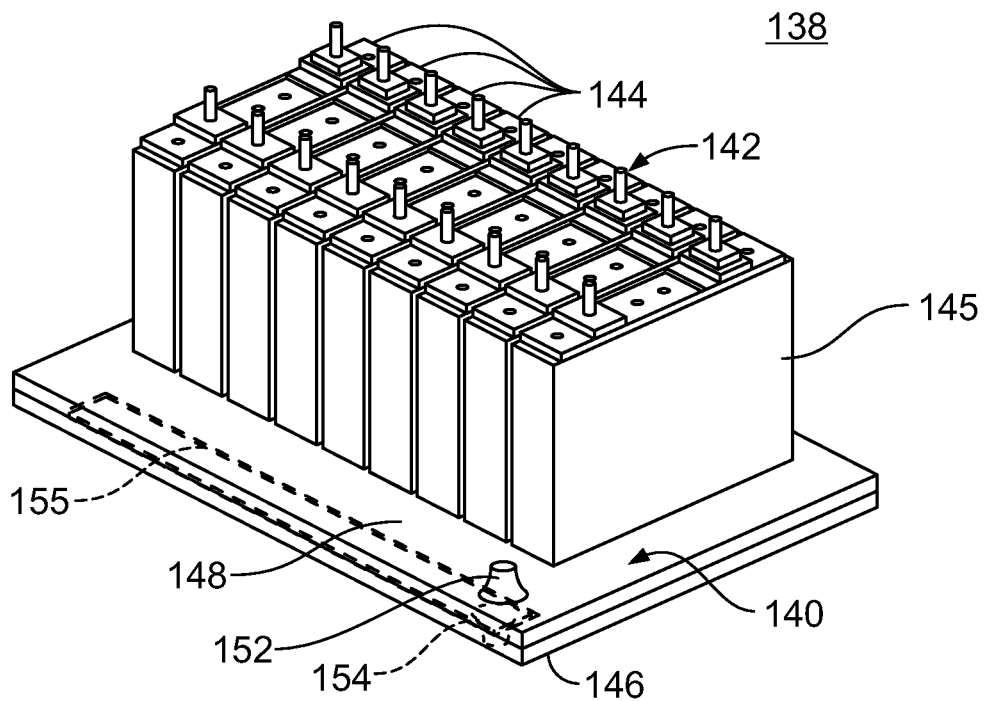
FIG. 4A is a perspective view of a portion of a traction battery assembly including a thermal plate supporting a battery cell array.
Figure 4B:
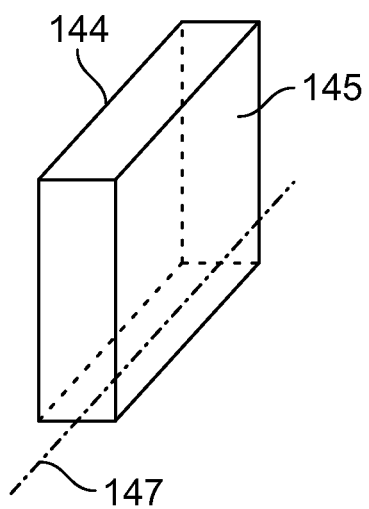
FIG. 4B is a perspective view of a battery cell from the battery cell array of FIG. 4A.

Now referring to FIGS. 4A and 4B, a portion of a traction battery assembly 138 is shown which may include a thermal plate 140 configured to support a battery cell array 142 including battery cells 144. Other structural elements (not shown) may be used to support the battery cell array 142 within the vehicle as well. The thermal plate 140 may also be configured for thermal communication with the battery cell array 142. Examples of thermal communication include conduction and convection. A bottom portion of the battery cells 144 or a bottom face of the battery cells 144 may directly contact the thermal plate 140 such that thermal plate 140 supports the battery cells 144. As described above, a sheet of thermal interface material (not shown) may be positioned between the thermal plate 140 and the battery cells 144. The thermal interface material may enhance heat transfer between the battery cells 144 and the thermal plate 140 by filling, for example, voids and/or air gaps between the battery cells 144 and the thermal plate 140. The thermal interface material may also provide electrical insulation between the battery cells 144 and the thermal plate 140. Each battery cell 144 may also define a face 145. The thermal plate 140 may include a bottom plate 146 and an upper plate 148. The upper plate 148 may be fixed to the bottom plate 146. While multiple methods of securing the upper plate 148 to the bottom plate 146 are available, one example for Aluminum plates includes brazing. Another example includes fastening methods using, for example, seals, nuts, and bolts. An inlet port 152 and an outlet port 154 may be positioned on the same end of the thermal plate 140 and may be in fluid communication with the channels as further described below. It is contemplated that other locations for the inlet port 152 and outlet port 154 may be available. For example, the inlet port 152 may be located above or below the thermal plate 140 and at different locations along the same end of the thermal plate 140. As another example, the outlet port 154 may be located above or below the thermal plate 140 and at different locations along the same end of the thermal plate 140. Further, it is contemplated that more than one inlet port 152 and/or outlet port 154 may be used with the thermal plate 140.

Figure 5:
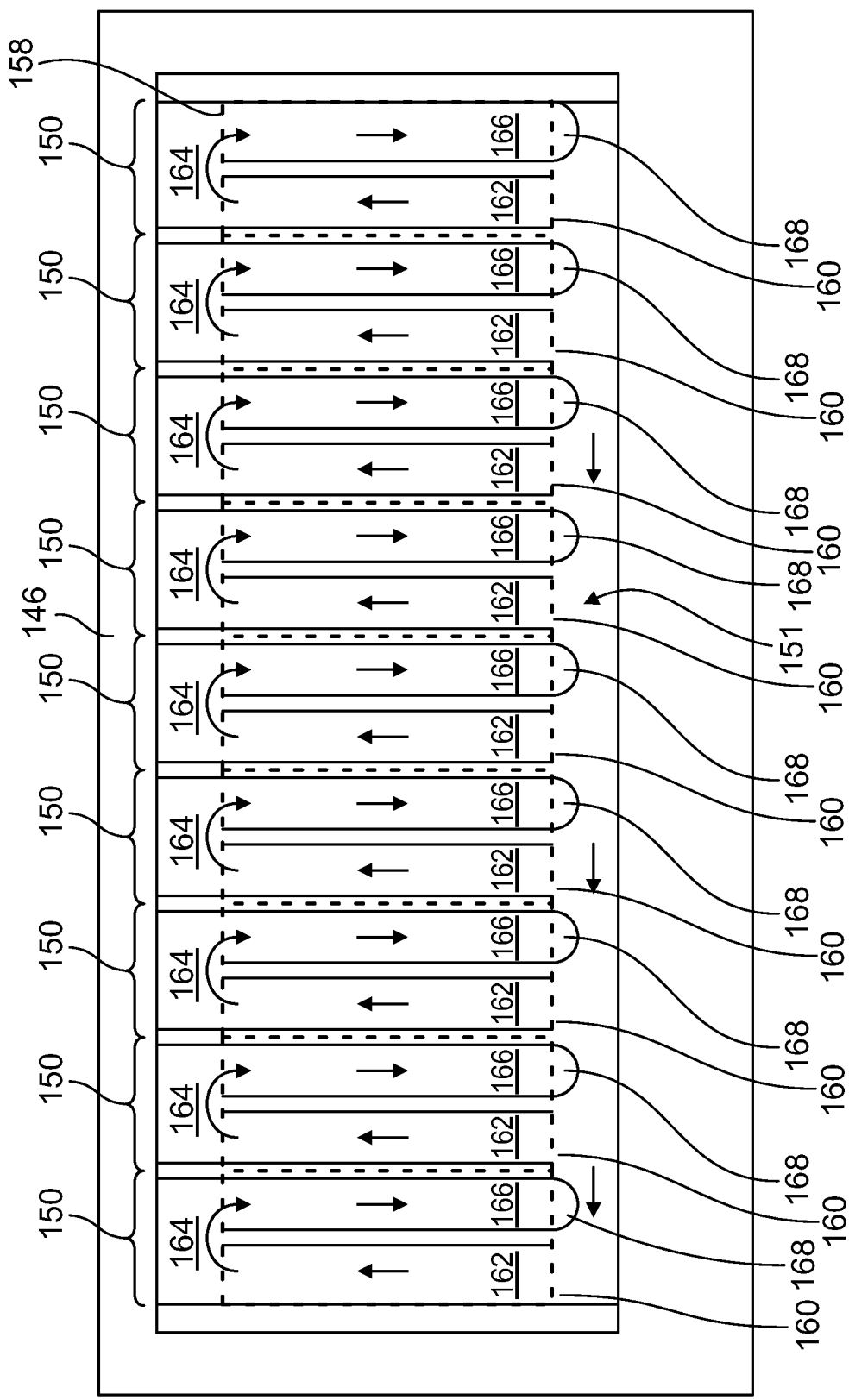
FIG. 5 is a plan view of a channel configuration for the thermal plate from FIGS. 4A through 4B.
Figure 6:
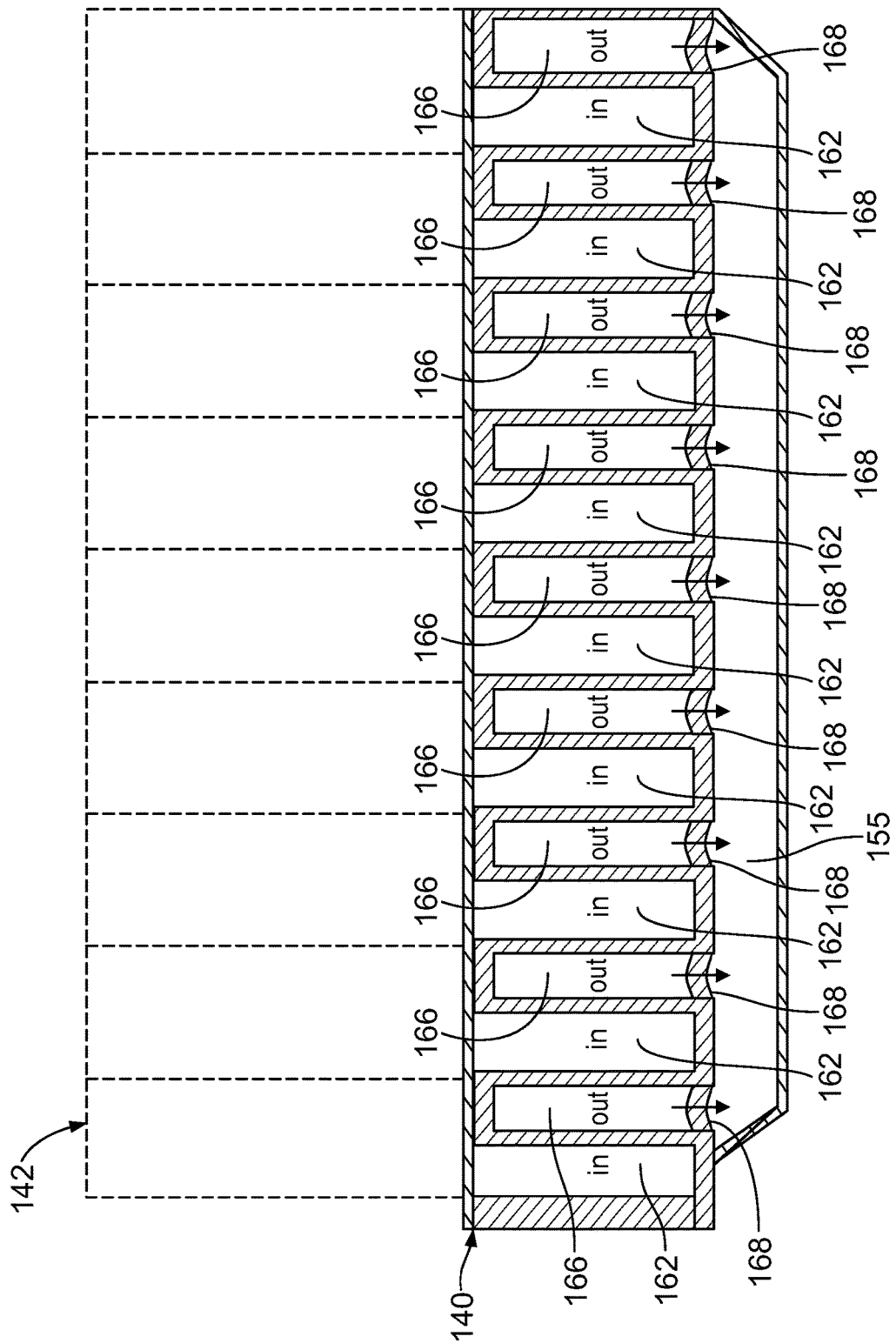
FIG. 6 is a side view, in cross-section, of a portion of the channel configuration for the thermal plate from FIGS. 4A through 4B.

Now additionally referring to FIG. 5, the bottom plate 146 may define one or more u-channel configurations 150 having a transverse orientation relative to the battery cell array 142 and a parallel orientation relative to a central axis 147 defined by a respective battery cell 144. Additionally, the u-channel configurations 150 may have a parallel orientation relative to a plane defined by the faces 145 of the battery cells 144. An inlet plenum 151 may be arranged between the inlet port 152 and the u-channel configurations 150. The inlet plenum 151 may be defined by the thermal plate 140. The inlet plenum 151 may also be separate from the thermal plate 140 and secured thereto. For example, the inlet plenum 151 may be located above or below the thermal plate 140. An outlet plenum 155 (shown in FIGS. 4A and 6) may be arranged between the u-channel configurations 150 and the outlet port 154. The outlet plenum 155 may be defined by the thermal plate 140. The outlet plenum 155 may be separate from the thermal plate 140 and secured thereto. For example, the outlet plenum 155 may be located above or below the thermal plate 140.

Each u-channel configuration 150 may correspond to one of the battery cells 144 represented by a dashed line footprint 158 in FIG. 5. For example, the u-channel configurations 150 may each be located below the corresponding battery cell 144 such that thermal fluid flows thereunder. It is also contemplated the each u-channel configuration may correspond to more than one cell and/or one cell and a portion of another cell. The u-channel configurations 150 may include adjacent channels to guide thermal fluid flow within the thermal plate 140. For example, each u-channel configuration 150 may include an inlet 160, and entry channel 162, a router 164, an exit channel 166, and an outlet 168. The inlets 160 and the outlets 168 may be located proximate to a same end of the corresponding battery cell 144. The routers 164 are sometimes referred to as U-bends. The inlets 160 and the outlets 168 may be adjacent to one another and may also be located at a same side portion of the thermal plate 140 as shown in FIGS. 4A and 5. Walls may at least partially define the channels and may be configured to promote heat transfer between fluid in contact therewith and the bottom plate 146. Now additionally referring to FIG. 6, thermal fluid may travel from the inlet plenum 151 to each of the entry channels 162 via the respective inlets 160. The entry channels 162 may be configured to deliver the thermal fluid flowing in a first direction to the respective router 164. The routers 164 may then redirect the thermal fluid to flow in a second direction within the respective exit channels 166. The thermal fluid may then travel through the outlets 168 and empty into the outlet plenum 155, and not directly into the entry channels 162 of another u-channel configuration 150. Thermal fluid flow in both the first direction and the second direction may travel in a direction substantially parallel to the battery cell central axis 147. The entry channels 162 may share a wall of an exit channel 166 of the same u-channel configuration 150. The exit channels 166 may also share a wall with an entry channel 162 of another u-channel configuration 150. The routers 164 may be located outside a region defined by the footprint 158 of the battery cell array 142 or the routers 164 may be within the footprint 158 of the battery cell array 142. The thermal plate 140 may define the u-channel configurations 150. For example, the bottom plate 146 and/or the upper plate 148 may define the u-channel configurations 150 and be secured to one another to form the thermal plate 140.

As described above, the u-channel configurations 150 may be arranged to alternate thermal fluid flow in adjacent channels between first and second directions. This arrangement may provide improved vehicle performance and assist in prolonging the life of the battery cells 144 when compared with a serial flow or a parallel flow arrangement as shown in FIGS. 3A and 3B, respectively. For example, thermal fluid entering the entry channels 162 may be referred to as "cold" fluid since the fluid is fresh from the inlet port 152. Thermal fluid flowing through the exit channels 166 may be referred to as "warm" or "hot" having a temperature higher than the cold fluids since heat may be absorbed from the respective battery cell 144 during travel from the inlet 160 to the outlet 168. In this example, channels with hot or warm fluid are not directly adjacent to one another and instead are separated by channels with cold fluid. This arrangement may assist in reducing cell ΔT and array ΔT since each battery cell 144 throughout the battery cell array 142 may receive the benefit of thermal fluid flowing at varied temperatures therebelow and within the channels.

Additional features to enhance heat transfer may include increasing a surface area within the channels. At least some of the surfaces of the channels may include flow features configured to increase an effective surface area the channels which contacts the thermal fluid flowing therein. For example, the flow features may include brazed split fins, brazed metal foam such as Aluminum, extrusions, dimples, or pedestals in the bottom plate 146 or the upper plate 148. These features may also assist in transferring more heat to the bottom plate 146. In addition to providing additional surface area to assist with heat transfer, these measures may also adjust a velocity of thermal fluid flow or induce fluid flow turbulence which may also enhance heat transfer.

FIGS. 7 through 10 show examples of plenum configurations which may be used with a traction battery assembly. FIG. 7 relates to FIGS. 4 through 6 and includes the thermal plate 140, the battery cell array 142, and the outlet plenum 155 secured below the thermal plate 140. FIG. 8 shows a thermal plate 200, a battery cell array 202, and an inlet plenum 204 secured above the thermal plate 200. FIG. 9 shows a thermal plate 210, a battery cell array 212, and an outlet plenum 214 secured above the thermal plate 210. FIG. 10 shows a thermal plate 220, a battery cell array 222, and an inlet plenum 224 secured below the thermal plate 220.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a plurality of battery cells;
an outlet plenum; and
a thermal plate supporting all of the plurality of battery cells, and having u-channel configurations each defining a flow path the entirety of which corresponds to only one of the plurality of battery cells and includes an inlet and outlet on a same side of the thermal plate, wherein fluid exiting the outlets empties into the outlet plenum external to the thermal plate.

2. The vehicle of claim 1, wherein the inlet and outlet are proximate to a same end of a corresponding battery cell.

3. The vehicle of claim 1, wherein each of the u-channel configurations defines an entry channel, an exit channel, and a router therebetween, and wherein the entry channel, exit channel and router are arranged such that fluid flow within the entry and exit channels is substantially parallel with an orientation of a corresponding battery cell.

4. The vehicle of claim 3, wherein each of the routers is at least partially disposed outside a region defined by a footprint of a corresponding battery cell of the plurality of battery cells.

5. The vehicle of claim 1, wherein each of the u-channel configurations defines an even number of channels.

6. The vehicle of claim 1, wherein at least some surfaces of the thermal plate defining the u-channel configurations include flow features configured to increase an effective area of the at least some of the surfaces.

7. The vehicle of claim 6, wherein the flow features include dimples, pedestals, or metal foam.

8. A vehicle comprising:
a plurality of battery cells each of the plurality of battery cells defining a central axis;
an inlet plenum; and
a thermal plate positioned beneath the plurality of battery cells and configured for thermal communication therewith, and having an outlet plenum and a plurality of u-channels within the thermal plate, wherein each of the u-channels defines a flow path in a first direction and a second direction the entirety of which corresponds to only one of the plurality of battery cells and the flow path is oriented such that the first and second directions are substantially parallel with the respective central axis, and each of the u-channels includes an inlet and outlet on a same side portion of the thermal plate, and wherein fluid exiting the inlet plenum enters the u-channels via the inlets.

9. The vehicle of claim 8, wherein the inlet and outlet of each of the u-channels are proximate to a same end of a corresponding battery cell.

10. The vehicle of claim 8, wherein each of the u-channels defines an entry channel, an exit channel, and a router therebetween, and wherein the entry channel, exit channel, and router are arranged such that fluid flow within the entry and exit channels is substantially parallel with an orientation of a corresponding battery cell of the plurality of battery cells.

11. The vehicle of claim 10, wherein each of the routers is at least partially disposed outside a region defined by a footprint of the corresponding battery cell.

12. The vehicle of claim 8, wherein at least some surfaces of the thermal plate defining the u-channels include flow features configured to increase an effective area of the at least some of the surfaces.

13. The vehicle of claim 12, wherein the flow features include dimples, pedestals, or metal foam.

14. A traction battery system comprising:
a battery cell array having battery cells;
a thermal plate positioned to support lower faces of the battery cells and arranged for thermal communication therewith, and having a plurality of u-channel configurations each including a flow path the entirety of which corresponds to only one of the battery cells, each including an entry channel having an inlet, each including an exit channel having an outlet, and a wall separating the entry and exit channels and the inlets and outlets being on a same side portion of the thermal plate;

an inlet plenum in communication with the inlets; and an outlet plenum in communication with the outlets such that fluid exiting the outlets empties into the outlet plenum and not into the inlet of another one of the entry channels, wherein one of the inlet plenum or the outlet plenum are an external component to the thermal plate.

15. The system of claim 14, wherein the inlet and outlet of each of the u-channel configurations are adjacent to one another.

16. The system of claim 14, wherein fluid flow within the entry and exit channels of each of the u-channel configurations is substantially parallel with an orientation of a corresponding battery cell.

17. The system of claim 14, wherein some of the u-channel configurations are arranged such that the entry and exit channels of different channel configurations share common walls.

18. The system of claim 14, wherein at least some surfaces of the thermal plate defining the u-channel configurations include flow features configured to increase an effective area of the at least some of the surfaces.

19. The system of claim 18, wherein the flow features include dimples, pedestals, or metal foam.

* * * * *